Dec. 11, 1923.

T. SLOPER 1,477,391

APPARATUS FOR USE IN THE MANUFACTURE OF RUBBER GOODS

Filed Jan. 11, 1923    2 Sheets-Sheet 1

INVENTOR
Thomas Sloper
by his attorneys
Byrnes, Stebbins & Parmelee

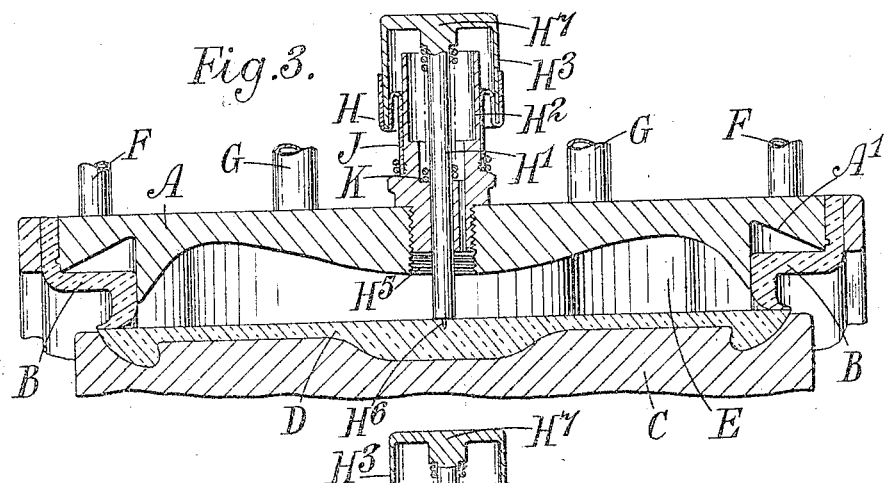
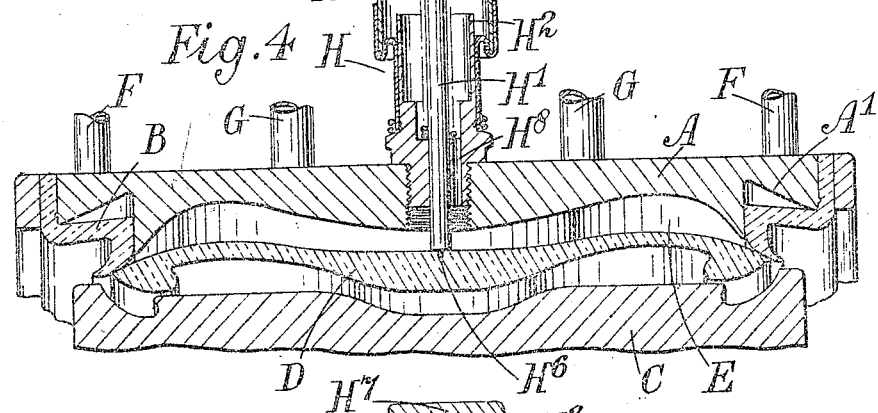
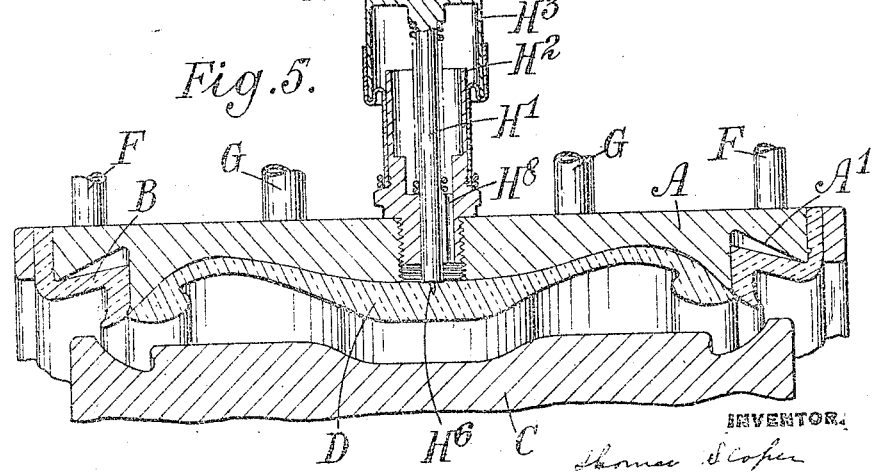

Patented Dec. 11, 1923.

1,477,391

UNITED STATES PATENT OFFICE.

THOMAS SLOPER, OF DEVIZES, ENGLAND.

APPARATUS FOR USE IN THE MANUFACTURE OF RUBBER GOODS.

Application filed January 11, 1923. Serial No. 611,992.

*To all whom it may concern:*

Be it known that I, THOMAS SLOPER, a subject of the King of England, residing at Devizes, Wiltshire, England, have invented certain new and useful Improvements in Apparatus for Use in the Manufacture of Rubber Goods, of which the following is a specification.

This invention is for improvements in or relating to apparatus for use in the manufacture of rubber goods and the method of handling such goods during manufacture.

Apparatus has heretofore been described and a method whereby a "flat" tyre-band can be removed from the cylindrical support whereon it has been vulcanized or partially vulcanized. One form of the apparatus described comprises a cavity-member or cooperating member which is annular in form and is brought into position round the cylindrical support with its tyre-band on it and is held in fixed relation thereto. The cavity-member has inwardly directed flexible sealing-lips which are pressed against the edges of the tire-band so that a closed chamber is thus formed with the tire-band as one wall, and then a greater air-pressure is established on that side of the tire-band which lies against the cylindrical support than on the other side so that the tire-band is expanded away from the cylindrical support, whereupon the support can be removed.

The cavity-member is in some cases made flat, that is to say cylindrical on its operative face with the exception of the edges which stand proud of the said face and constitute the sealing-means with the tire-band.

It is found that in operating apparatus such as this, or the converse form i. e. in which the tire-band would be on the inner periphery of an annular support and the cavity member would be in the form of an interior cylindrical member—one edge of the tire-band is liable to become detached from the support before the other edge. This causes a lateral movement of the tyre-band which results in breaking the sealing-joint at that edge which first becomes detached. It is consequently desirable to ensure against the lateral movement of the tyre-band as it comes away from its support, and one of the objects of the present invention is to provide means to prevent such lateral movement.

According to this invention, there is combined with the cavity member which with its sealing-lips makes a chamber with the tyre-band, engaging means mounted in said member, guided or restrained to move in a path approximately radially across the chamber and arranged to engage the tyre-band in such manner as to prevent it from moving laterally as it is displaced from its support.

The engaging means may take the form of a plurality of members (for example plungers) guided mechanically for movement radially across the chamber and each arranged to engage (for example by a spike) the tyre-band.

Preferably, the engaging members are provided with yielding controlling means, which when in operation, tend to advance them against the tyre-band, the thrust of which controlling means is arranged to be less than that of the difference of the pneumatic pressure on the two sides of the band.

Conveniently, the said controlling means takes the form of a plurality of piston members, one carried by each plunger and operating each in conjunction with a barrel, for example a collapsible tubular casing, that opens into the chamber, whereby the pistons are exposed to the pressure established for removing the tyre-band and are advanced into engagement with the latter, but the area of the pistons exposed to this pressure is less than that of the tyre-band, so that the plungers will be thrust back as the tyre-band expands.

Other features of the invention will be described hereinafter and pointed out in the claims.

One embodiment of the invention is illustrated by way of example in the accompanying drawing. It is to be understood, however, that various changes may be made in the constructional details enumerated. In said drawings.

Like reference numerals designate like parts throughout the several views.

An annular cavity member A having sealing lips B arranged to be seated by suction in lateral annular grooves $A^1$, is provided to co-operate with a cylindrical support C carrying a "flat" tyre-band D and to form therewith an annular chamber E (Figures 3 and 4), whereby the tyre-band can be removed from its support, and if desired, transferred to another support, as described in the parent specification mentioned above, conduits F and G being provided for exhausting air from the grooves $A^1$ and from the said chamber, respectively.

According to the present invention, engaging means, designated generally by the letter H, are provided on the cavity member A for engaging the tyre-band and maintaining it in a central position as it expands away from its support. These engaging means take the form of a plurality of plungers $H^1$, whereof only one is shown, but which may be, say, six in number, arranged along the central circumferential line of the cavity member A.

The plunger $H^1$ is slidable radially in relation to the cavity member A in a two-part barrel $H^2$, $H^3$ comprising a fixed part $H^2$ and a movable part $H^3$, the part $H^2$ having its one end $H^4$ screwed into an orifice $H^5$ in the cavity member A. One end of the plunger can enter the annular chamber and is provided with a spike $H^6$ for entering the tyre-band. Surrounding the other end of the part $H^2$ and secured fluid-tight thereto is an india-rubber sleeve J which also makes a fluid-tight joint at its other end with the head $H^7$ of the plunger. This head is of larger diameter than the part $H^2$ of the barrel and is in the form of a disc having a cylindrical flange that constitutes the movable part $H^3$ of the barrel and is arranged to telescope with the fixed part $H^2$. A light compression spring K surrounds the plunger $H^1$ and tends to keep the two parts $H^2$, $H^3$ in extended relation so that the plunger is normally kept at the limit of its radial movement outwards. A duct $H^8$ connects the interior of the barrel with the chamber E, so that when the air is exhausted from this chamber to remove the tyre-band, air will also be exhausted from the barrels of the plungers, whereby the plungers are caused to advance against the tyre-band, so that the spike at the end of each plunger is thrust into the tyre-band.

Figure 1:
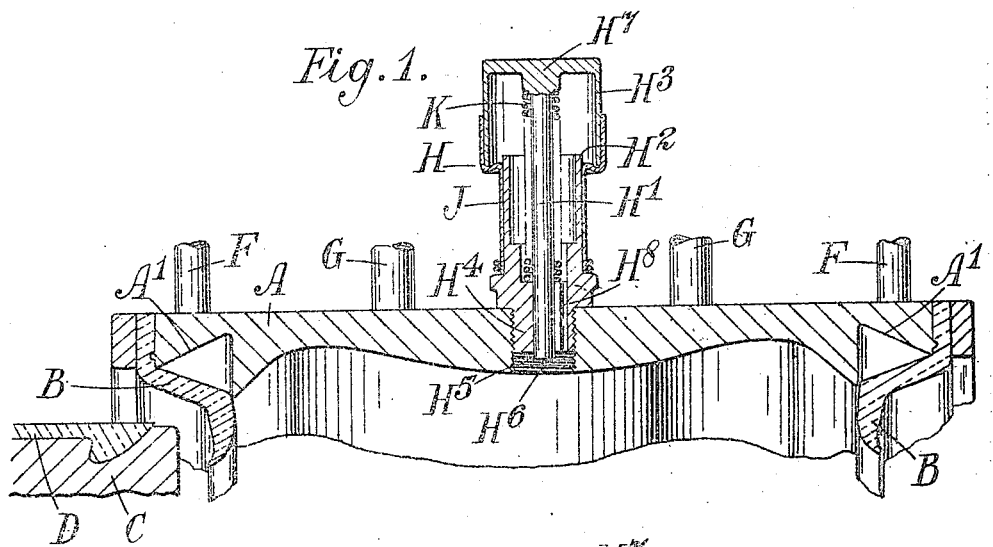
Figure 1 is a vertical sectional elevation of apparatus according to the invention. comprising a support for a tyre-band and an annular cavity member therefor having means for engaging the band, the sealing lips being shown flexed away from the cavity member, and the tyre-band and its support being shown outside the latter.
Figure 2:
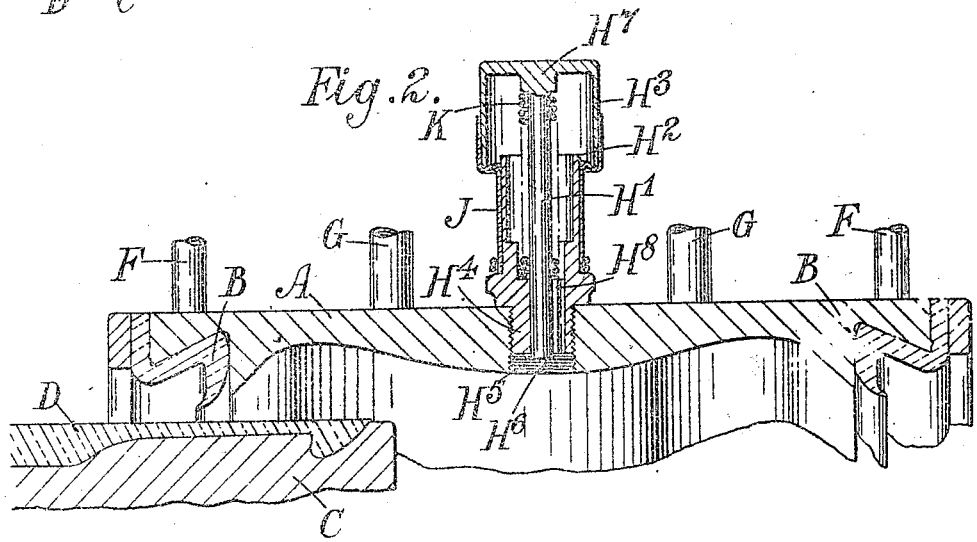
Figure 2 shows a like section showing the sealing lips seated in their grooves, and the tyre-band on its support being placed in position centrally within the cavity member, and Figures 3 to 5 again show like sections but showing the parts in different positions illustrating the operation of removing the tyre-band from its support.

The described apparatus operates as follows:

Assuming that the parts are in the position shown in Figure 1 and that a tyre-band D on the support C is to be removed from the latter, air will first be exhausted from the grooves $A^1$, causing the sealing lips B to be seated on their seats, as shown in Figure 2. The support C and the band D can now be placed centrally within the cavity member A, and on air being admitted to the grooves $A^1$ the sealing lips B will flex outwardly and make fluid-tight joints with the lateral edges of the tyre-band D, as shown in Figure 3. The air in the chamber E is now exhausted through the conduits G which causes all the plungers to advance against the tyre-band, so that their spikes enter it and maintain it in a central position while it is being expanded away from its support C owing to the air pressure established on the side of the band which is towards the support. As the band expands in this manner, as illustrated in Figure 4, it thrusts the plungers radially outwards, because the total fluid pressure on the tyre-band is greater than the total fluid pressure on the plungers tending to advance them radially inwards, although this latter pressure still keeps the plungers in engagement with the tyre-band. When sufficient air has been exhausted from the chamber E the tyre-band will finally be seated against the inner face of the cavity member A as shown in Figure 5, whereupon the support C can be removed from the cavity member A. It will be seen that the tyre-band is rigidly held throughout the whole of its expanding movements against any lateral displacement, so that no breaking of the sealing-joints at the edges of the tyre-band results from lateral movement.

It is to be understood that various modifications can be made in the construction described above without departing from the invention as defined in the claims. For example, if the tyre-band is on the inner periphery of an annular support from which it is to be removed to an inner cylindrical cavity member, then the engaging means for guiding the band will be provided on the inner cylindrical member to which the band is to be removed. Further, the plungers may be formed as piston members operating in one-part rigid barrels open at one side of the piston members to atmosphere and at the other side to the pressure established at the operative face of the cavity member carrying them.

What I claim as my invention and desire to secure by Letters Patent is:

1. In apparatus for use in manipulating endless "flat" expansible bands, the combination with a co-operating member having an annular face whereof the general axial direction is parallel to a throughway axis of the member, and two annular sealing members carried thereon, one on each edge thereof, and arranged to make sealing contact with the edge portions of a band and thereby form a closed annular chamber whereof the said band constitutes a flexible wall, of engaging means mounted in said co-operating member, restrained to move in a path approximately radial to said chamber, and adapted to engage the band and thereby prevent it from moving laterally as it moves towards said face, substantially as set forth.

2. In apparatus for use in manipulating endless "flat" expansible bands, the combination with a co-operating member having an annular face whereof the general axial direction is parallel to a throughway axis of the member and two annular sealing members carried thereon, one on each edge thereof, and arranged to make sealing contact with the edge portions of a band and thereby form a closed annular chamber whereof the said band constitutes a flexible wall, of a plurality of engaging members mounted in said co-operating member and mechanically guided each to move radially across said chamber and engage the band and thereby prevent the band from moving laterally as it moves towards said face, substantially as set forth.

3. In apparatus for use in manipulating endless "flat" expansible bands, the combination with a co-operating member having an annular face whereof the general axial direction is parallel to a throughway axis of the member, and two annular sealing members carried thereon, one on each edge thereof, and arranged to make sealing contact with the edge portions of a band and thereby form a closed annular chamber whereof the said band constitutes a flexible wall, of a plurality of engaging members mounted in said co-operating member and mechanically guided each to move radially across said chamber and engage the band and thereby prevent the band from moving laterally as it moves towards said face, and yielding controlling means tending to advance said engaging means in the direction of the band, substantially as set forth.

4. In apparatus for use in manipulating endless "flat" expansible bands, the combination with a co-operating member having an annular face whereof the general axial direction is parallel to a throughway axis of the member, and two annular sealing members carried thereon, one on each edge thereof, and arranged to make sealing contact with the edge portions of a band and thereby form a closed annular chamber whereof the said band constitutes a flexible wall, of a plurality of plungers mounted in said co-operating member and mechanically guided each to move radially across said chamber, each plunger having at that end directed towards the band a spike adapted to engage the band and thereby prevent it from moving laterally as it moves towards said face, substantially as set forth.

5. In apparatus for use in manipulating endless "flat" expansible bands, the combination with a co-operating member having an annular face whereof the general axial direction is parallel to a throughway axis of the member, and two annular sealing members carried thereon, one on each edge thereof, and arranged to make sealing contact with the edge portions of a band and thereby form a closed annular chamber whereof the said band constitutes a flexible wall, of a plurality of barrels mounted on said co-operating member, and each in open communication with said chamber, a plurality of piston members operating each in conjunction with one of said barrels and having each a rod constituting a plunger that extends into said chamber and is guided to move radially across the chamber, the end of each plunger in said chamber being adapted to engage the band, the total area of the faces of the pistons exposed to the fluid pressure obtaining in said annular chamber being less than the area of the band exposed to the same pressure, substantially as set forth.

6. In apparatus for use in manipulating endless "flat" expansible bands, the combination with a co-operating member having an annular face whereof the general axial direction is parallel to a throughway axis of the member, and two annular sealing members carried thereon, one on each edge thereof, and arranged to make sealing contact with the edge thereof, and arranged to make sealing contact with the edge portions of a band and thereby form a closed annular chamber whereof the said band constitutes a flexible wall, of a plurality of barrels each in the form of a collapsible tubular casing mounted on said co-operating member, and each in open communication with said chamber, a plurality of piston members operating each in conjunction with one of said barrels and having each a rod constituting a plunger that extends into said chamber and is guided to move radially across the chamber, the end of each plunger in said chamber being adapted to engage the band, the total area of the faces of the pistons exposed to the fluid pressure obtaining in said annular chamber being less than the area of the band exposed to the same pressure, substantially as set forth.

7. In apparatus for use in manipulating endless "flat" expansible bands, the combination with a co-operating member having an annular face whereof the general axial direction is parallel to a throughway axis of the member, and two annular sealing members carried thereon, one on each edge thereof, and arranged to make sealing contact with the edge portions of a band and thereby form a closed annular chamber whereof the said band constitutes a flexible wall, of a plurality of barrels each comprising two parts whereof one is mounted on said co-operating member, the other constitutes a piston head having a tubular portion arranged to telescope with its co-operating part, and a yielding sleeve is secured fluid-tight over the opposed ends of the two parts to make a collapsible joint therewith, each piston head having a rod constituting a plunger that extends into said chamber and is guided to move radially across the chamber, the end of each plunger in said chamber being pointed to engage the band, the total area of the faces of the pistons exposed by the fluid pressure obtaining in said chamber being less than the area of the band exposed to the same pressure, substantially as set forth.

8. In apparatus for use in manipulating endless "flat" expansible bands, the combination with a co-operating member having an annular face whereof the general axial direction is parallel to a throughway axis of the member, and two annular sealing members carried thereon, one on each edge thereof, and arranged to make sealing contact with the edge portions of a band and thereby form a closed annular chamber whereof the said band constitutes a flexible wall, of a plurality of barrels each comprising two parts whereof one is mounted on said co-operating member, the other constitutes a piston head having a tubular portion arranged to telescope with its co-operating part, a yielding sleeve secured fluid-tight over the opposed ends of the two parts to make a collapsible joint therewith, and a spring tending to keep the two parts of a barrel in extended relation, each piston head having a rod constituting a plunger that extends into said annular chamber and is guided to move radially across the chamber, the end of each plunger in said chamber being adapted to engage the band, the total area of the faces of the pistons exposed to the fluid pressure obtaining in said chamber being less than the area of the band exposed to the same pressure, substantially as set forth.

9. Apparatus for manipulating "flat" endless expansible bands comprising in combination a support for an endless band, having an annular face whereof the general direction is parallel to a throughway axis thereof, a co-operating member having an annular face for receiving the band from said support, the general direction of the latter face being parallel to the throughway axis of the co-operating member, and two annular grooves, one at each edge of said face, two annular sealing lips carried on said member one at each edge thereof and arranged to make sealing contact with the edge portions of the band on said support and thereby form an annular cavity whereof the said band constitutes a flexible wall, which sealing lips can enter radially into said grooves whilst contacting with said band, means for exhausting air from said cavity and from said grooves, and engaging means mounted on said co-operating member, which engaging means are restrained to move in a path approximately radial to said annular cavity and are adapted to engage the band under the action of reduction of pressure in the annular cavity, and thereby prevent the band from moving laterally as it moves towards said face, substantially as set forth.

10. Apparatus for manipulating "flat" endless expansible bands comprising in combination a support for an endless band having an annular face whereof the general direction is parallel to a throughway axis thereof, an annular co-operating member having an internal recessed cylindrical face for receiving the band from the support, and two annular grooves, one at each edge of said face, two annular sealing lips carried on said member, one at each edge thereof and arranged to make sealing contact with the edge portions of the band on said support and thereby form an annular cavity whereof the said band constitut a flexible wall, which sealing lips can enter radially into said grooves, whilst contacting with said band, means for exhausting air from said cavity and from said grooves, and a plurality of barrels mounted on the outside of said cooperating member and in open communication each with said annular cavity, a plurality of piston members operating each in conjunction with one of said barrels, and having each a rod constituting a plunger that extends into said annular cavity and is guided to move radially across the said cavity, the end of each plunger in said cavity being adapted to engage the band, the total area of the faces of the pistons exposed to the fluid pressure obtaining in said annular cavity being less than the area of the band exposed to the same pressure, substantially as set forth.

In testimony whereof I affix my signature.

THOMAS SLOPER.